(12) United States Patent
Harty (10) Patent No.: US 11,170,406 B2
(45) Date of Patent: Nov. 9, 2021

(54) SYSTEM AND METHODS FOR BATTERY ELECTRIC VEHICLE DRIVING ANALYSIS

(71) Applicant: Honda Motor Co., Ltd., Tokyo (JP)

(72) Inventor: Ryan D. Harty, Long Beach, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 411 days.

(21) Appl. No.: 15/850,067

(22) Filed: Dec. 21, 2017

(65) Prior Publication Data

US 2019/0197580 A1 Jun. 27, 2019

(51) Int. Cl.
*G06Q 30/02* (2012.01)
*G07C 5/00* (2006.01)

(52) U.S. Cl.
CPC ..... *G06Q 30/0255* (2013.01); *G06Q 30/0269* (2013.01); *G07C 5/008* (2013.01)

(58) Field of Classification Search
CPC . G06Q 30/0255; G06Q 30/0269; G07C 5/008
See application file for complete search history.

(56) References Cited

U.S. PATENT DOCUMENTS

| | | |
|---|---|---|
| 7,080,052 B2 | 7/2006 | Busche |
| 8,180,655 B1 | 5/2012 | Hopkins, III |
| 8,255,244 B2 | 8/2012 | Raines et al. |
| 8,346,420 B2 * | 1/2013 | Tarnowsky ............ G01F 9/001 |
| | | 701/22 |
| 8,920,173 B1 * | 12/2014 | Fitzgerald ............... G09B 9/04 |
| | | 434/62 |
| 9,047,616 B2 | 6/2015 | Schnabl et al. |
| 9,536,197 B1 | 1/2017 | Penilla et al. |
| 2002/0120394 A1 * | 8/2002 | Rayne ..................... G01S 1/045 |
| | | 701/408 |
| 2004/0102197 A1 * | 5/2004 | Dietz ...................... H04W 4/00 |
| | | 455/456.1 |
| 2007/0282495 A1 * | 12/2007 | Kempton ............... B60L 53/65 |
| | | 701/22 |

(Continued)

OTHER PUBLICATIONS

UC Davis Plug-in Hybrid & Electric Vehicle Research Center, FAQ, Sep. 28, 2017, Internet Archive Way Back Machine (Year: 2017).*

(Continued)

*Primary Examiner* — James M Detweiler
(74) *Attorney, Agent, or Firm* — Armstrong Teasdale LLP (57) ABSTRACT

A system for battery electric vehicle driving analysis is provided. The system includes a vehicle including a plurality of sensors. The vehicle is configured to transmit a plurality of sensor information observed by the plurality of sensors. The system also includes a driver analysis computer device including at least one processor in communication with at least one memory device. The driver analysis computer device is programmed to receive the plurality of sensor information from the vehicle. The plurality of sensor information includes information for a plurality of days. The driver analysis computer device is also programmed to determine, for each day of the plurality of days, a daily driving distance of the vehicle based on the plurality of sensor information, compare the plurality of daily driving distances to a first threshold, and transmit one or more advertisements for a new vehicle based on the comparison.

9 Claims, 7 Drawing Sheets

(56) References Cited

U.S. PATENT DOCUMENTS

| | | | |
|---|---|---|---|
| 2007/0294722 A1* | 12/2007 | Kang | H04H 60/27 725/34 |
| 2008/0195435 A1 | 8/2008 | Bentley et al. | |
| 2009/0109037 A1* | 4/2009 | Farmer | G06Q 20/102 340/576 |
| 2009/0138906 A1* | 5/2009 | Eide | G06Q 30/0264 725/32 |
| 2010/0082179 A1* | 4/2010 | Kronenberg | B62D 12/02 701/1 |
| 2010/0094496 A1* | 4/2010 | Hershkovitz | B60L 53/14 701/22 |
| 2010/0209892 A1* | 8/2010 | Lin | G09B 9/05 434/71 |
| 2011/0144839 A1* | 6/2011 | Pudar | B60W 40/09 701/22 |
| 2013/0073267 A1* | 3/2013 | Gearhart | B60L 3/12 703/2 |
| 2013/0344905 A1* | 12/2013 | Kim | H04W 4/029 455/466 |
| 2014/0129080 A1* | 5/2014 | Leibowitz | G06Q 30/0631 701/33.3 |
| 2014/0188304 A1* | 7/2014 | Richter | B60L 3/00 701/1 |
| 2015/0093722 A1* | 4/2015 | Fitzgerald | G09B 9/04 434/62 |
| 2016/0125673 A1 | 5/2016 | Bromham et al. | |
| 2016/0132913 A1 | 5/2016 | Hanjrah et al. | |
| 2016/0180358 A1 | 6/2016 | Battista | |
| 2016/0371739 A1 | 12/2016 | Chervil | |
| 2017/0116618 A1 | 4/2017 | Brandon et al. | |
| 2018/0233045 A1* | 8/2018 | Kumar | G01C 21/28 |

OTHER PUBLICATIONS

Autotrader, Is an electric vehicle right for you?, May 2014 (Year: 2014).*
"Does this range suit be? Range satisfaction of battery electric vehicle users" (Franke, Thomas et al.; available online on Jul. 4, 2017 at Applied Ergonomics journal available at Elsevier.com); (Year: 2017).*
"Rapid Estimation of electric vehicle acceptance using a general description of driving patterns" (Tamor, Michael et al.; available online on Dec. 18, 2014 at Applied Ergonomics journal available at Elsevier.com) (Year: 2014).*
"MyGreenCar.com" (website for the MyGreenCar mobile app—captured using the internet archive Wayback Machine on Jun. 23, 2021) (Year: 2017).*
"Auto Trader Is an Electric Vehicle Right for You?" (published May 2014) (Year: 2014).*

* cited by examiner

FIGURE 7

SYSTEM AND METHODS FOR BATTERY ELECTRIC VEHICLE DRIVING ANALYSIS

BACKGROUND OF THE DISCLOSURE

The field of the disclosure relates generally to battery electric vehicle driving analysis, and more specifically to methods and systems for use in analyzing driving behavior for marketing battery electric vehicles.

Generally, different electric vehicles have different travel profiles. These travel profiles include distance traveled per charge and charging time. Furthermore, the distance traveled per charge may vary based on a variety of conditions, such as weather, heating and air conditioning use, speed, and/or elevation changes. In addition, many drivers of electric vehicles leave a buffer amount of charge to prevent running out of charge. Furthermore, repeated fast charging of electric vehicles may damage the vehicle's battery. As it is necessary to determine the proper travel profile for an electric vehicle based on how the driver will use the vehicle.

BRIEF DESCRIPTION OF THE DISCLOSURE

In one aspect, a system is provided. The system includes a vehicle including a plurality of sensors. The vehicle is configured to transmit a plurality of sensor information observed by the plurality of sensors. The vehicle is associated with an owner. The system also includes a driver analysis computer device including at least one processor in communication with at least one memory device. The driver analysis computer device is programmed to receive the plurality of sensor information from the vehicle. The plurality of sensor information includes information for a plurality of days. The driver analysis computer device is also programmed to determine, for each day of the plurality of days, a daily driving distance of the vehicle based on the plurality of sensor information, compare the plurality of daily driving distances to a first threshold, and transmit one or more advertisements for a new vehicle to the owner based on the comparison.

In another aspect, a computer device is provided. The computer device includes at least one memory and at least one processor in communication with the at least one memory. The at least one processor is programmed to receive a plurality of sensor information from a vehicle. The plurality of sensor information includes information for a plurality of days. The at least one processor is also programmed to determine, for each day of the plurality of days, a daily driving distance of the vehicle based on the plurality of sensor information, compare the plurality of daily driving distances to a first threshold, and transmit one or more advertisements for a new vehicle to an individual associated with the vehicle based on the comparison.

In yet another aspect, a method for battery electric vehicle driving analysis is provided. The method is implemented by at least one processor in communication with at least one memory. The method includes receiving a plurality of sensor information from a vehicle. The plurality of sensor information includes information for a plurality of days. The method also includes determining, for each day of the plurality of days, a daily driving distance of the vehicle based on the plurality of sensor information, comparing the plurality of daily driving distances to a first threshold, and transmitting one or more advertisements for a new vehicle to an individual associated with the vehicle based on the comparison.

BRIEF DESCRIPTION OF THE DRAWINGS

FIGS. 1-7 illustrate exemplary embodiments of the methods and systems described herein.

DETAILED DESCRIPTION OF THE DISCLOSURE

The following detailed description illustrates exemplary embodiments by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. These system and methods are for analyzing driving behavior for marketing battery electric vehicles s.

The methods and system described herein may be implemented using computer programming or engineering techniques including computer software, firmware, hardware, or any combination or subset. As described above, at least one technical problem with known systems is a need to determine which drivers are appropriate for specific vehicles based on the driver's driving profile. The system and methods described herein address that technical problem. The technical effect of the systems and processes described herein is achieved by performing at least one of the following steps: (a) receive a plurality of sensor information from a vehicle, wherein the plurality of sensor information includes information for a plurality of days; (b) determine, for each day of the plurality of days, a daily driving distance of the vehicle based on the plurality of sensor information; (c) calculate the first threshold based on a percentage of days where the daily driving distance for that day exceeded the usable range of the BEV; (d) compare the plurality of daily driving distances to a first threshold, wherein the first threshold is based on a usable range of the BEV; (e) determine a number of days that the daily driving distance for the vehicle exceeded the usable range of the BEV; (f) determine whether the number of days exceeds the first threshold; (g) calculate a percentage of the number of days and a total number of days for the plurality of days; (h) determine whether the percentage of the number of days exceeds the first threshold; (i) calculate a second threshold based on a fast recharge of the BEV and a percentage of days where the daily driving distance exceeds the first threshold and does not exceed the second threshold; (j) compare the daily driving distance to the first threshold and the second threshold; and (k) transmit one or more advertisements for a new vehicle to an individual associated with the vehicle based on the comparison, wherein the new vehicle is a battery electric vehicle (BEV). The resulting technical effect is that drivers with driving behaviors that match with the attributes of the battery electric vehicle are identified.

In some embodiments, the technical effect of the systems and processes described herein is achieved by performing at least one of the following steps: (a) calculate a habitual peak for the vehicle based on a mean of the plurality of daily driving distances; (b) calculate a probability that the vehicle will exceed the usable range of the BEV; and (c) transmit the one or more advertisements for the BEV to the individual where the habitual peak does not exceed the first threshold and where the probability does not exceed a second threshold. The resulting technical effect is that drivers with driving behaviors that match with the attributes of the battery electric vehicle are identified.

In some embodiments, the technical effect of the systems and processes described herein is achieved by performing at least one of the following steps: (a) determine a plurality of distances travelled by the vehicle based on the plurality of sensor information; (b) determine a number of days each distance of the plurality of distances was travelled by the vehicle; (c) compare the plurality of distances to the first threshold to determine the number of days the first threshold was exceeded; (d) determine whether or not to transmit the one or more advertisements based on the comparison; (e) determine a percentage of the number of days that the first threshold was exceeded; and (f) compare the percentage to a predetermined threshold to determine whether or not to transmit the one or more advertisements. The resulting technical effect is that drivers with driving behaviors that match with the attributes of the battery electric vehicle are identified.

In some embodiments, the technical effect of the systems and processes described herein is achieved by performing at least one of the following steps: (a) receive a plurality of sensor information from a plurality of vehicles associated with a plurality of individuals; (b) determine the plurality of daily driving distances for each of the plurality of vehicles; (c) compare each of the plurality of daily driving distances for each of the plurality of vehicles to the first threshold; (d) determine a subset of the plurality of individuals based on the comparison; and (e) transmit one or more advertisements for the new vehicle to the subset of the plurality of individuals. The resulting technical effect is that drivers with driving behaviors that match with the attributes of the battery electric vehicle are identified.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

In another embodiment, a computer program is provided, and the program is embodied on a computer-readable medium. In an exemplary embodiment, the system is executed on a single computer system, without requiring a connection to a server computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

One or more embodiments include a system, which may be implemented as a programmable logic controller (PLC), also referred to as a programmable logic circuit that controls various functions and operations of the vehicle, such as the climate control system, navigation system, information system, audio system, phone system, rear entertainment system, and the like. The controller may control display functions on one or more display devices or screens. The controller may monitor, receive, detect, and/or transmit one or more inputs or outputs between a display device and a control panel.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Figure 1:
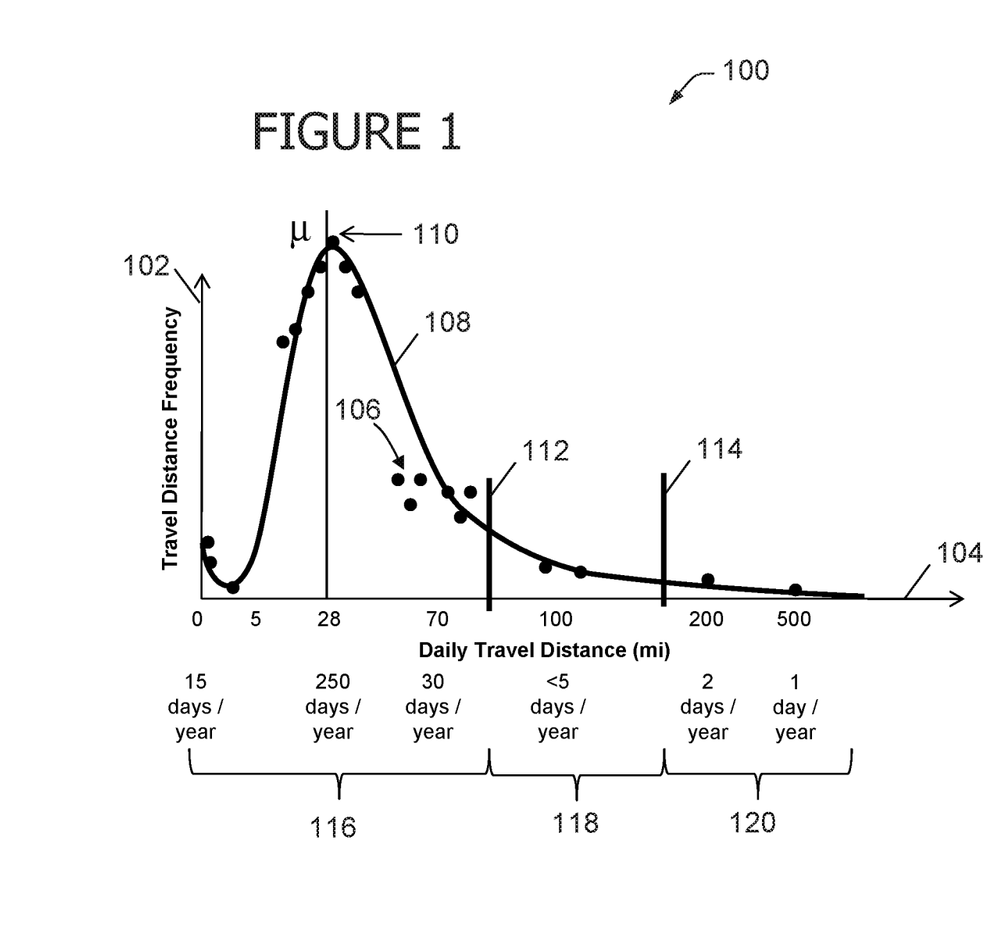
FIG. 1 is a graphical view of an exemplary driving profile of a vehicle.

FIG. 1 is a graphical view of an exemplary driving profile 100 of a vehicle. In the exemplary embodiment, driving profile 100 illustrates the frequency that a vehicle is driven a specific distance in a single day, also known as the daily driving distance. In the exemplary embodiment, driving profile 100 represents the current travel habits of a vehicle. In other embodiments, driving profile 100 represents the driving habits of an individual driver. This may be a commuter vehicle that allows one or more individuals to commute back and forth to work. The x-axis 104 of driving profile 100 is daily driving distance in miles. The y-axis 102 of driving profile 100 is travel distance frequency, which is the number of days in a year that that distance was the daily driving distance. In the exemplary embodiment, driving profile 100 includes a plurality of data points 106. Each data point 106 represents the number of days in a year that a specific distance was travelled. Therefore, for a data point 106 where x=70 miles and y=30 days, then the vehicle travelled 70 miles on 30 days in a single year. Curve 108 represents a fitted curve to the data points 106 included in driving profile 100.

Driving profile 100 also includes a mean 110, also known as habitual peak. Mean 110 is the highest point of curve 108 and represents the most commonly traveled distance by the vehicle. The closer that mean 110 is to the left side of driving profile 100, the shorter the daily commute.

In the exemplary embodiment, driving profile 100 is generated based on a plurality of sensor data from the vehicle in question. The plurality of sensor data includes at least a distance that the vehicle travelled each day. This may include travel data from a plurality of years. This data may vary based on the driver's needs. For example, some days the vehicle just drove to work and back. Other days the vehicle may not have driven at all. Some days, the vehicle may have had to drive to and from work multiple times, such as when the driver may have to return home to let a repair person into the house, to pick up something that the driver forgot, or to take care of a sick child. And there may be some days with very high distances travelled, such as when the driver decided to take the vehicle on a trip.

In the exemplary embodiment, the driving behaviors shown in driving profile 100 are compared to the attributes of a battery electric vehicle (BEV), such as, but not limited to, the range of the BEV. In the exemplary embodiment, driving profile 100 also includes a first threshold 112 and a second threshold 114. In this embodiment, first threshold 112 represents a first maximum distance. This may be the maximum distance that a BEV may travel on a single charge. Second threshold 114 represents a second maximum distance. This may be the maximum distance that the BEV may travel on two charges, such as if the vehicle Is able to charge at work or if the driver has access to a fast charging station. By comparing driving profile 100 and mean 110 to the two thresholds 112 and 114, a correlation between the usage of the vehicle and the attributes of the BEV may be determined. In other embodiments, first threshold 112 and second threshold 114 may relate to the range of a fuel cell vehicle, a plug-in hybrid vehicle, or any other vehicle with a limited daily travel range, where it may be difficult and/or time-consuming to recharge or refuel the vehicle in question.

In the exemplary embodiment, a first region 116 represents the expected normal daily use of the vehicle associated with driving profile 100 in relation to a single charge of the BEV. A second region 118 represents unexpected normal daily use of the vehicle that could be dealt with by DC fast charging of the BEV. A third region 120 represents very long trips which may be beyond the capabilities of the BEV.

In the exemplary embodiment, the three regions 116, 118, and 120 are compared to curve 108 and the data points 106 to determine whether or not a BEV would work to replace the vehicle in question. In some embodiments, this analysis is to see if the BEV would be an acceptable match to replace a family car. In other embodiments, the analysis is performed to see if the BEV would be able to replace a company car or a fleet of company vehicles, such as delivery vehicles. First region 116 represents the BEV's general travel capabilities. For a match to occur, the bulk of the vehicle's travel would have to be within first region 116 and thus less than first threshold 112. In some embodiments, this would represent 90-99% of the days of the year, where the vehicle would be driven less than the usable range of the BEV. Second region 118 represents the BEV's travel capabilities with a recharge. While the vehicle would normally be able to be recharged overnight, the days in second region 118 represent times when a longer charging time might not be a viable option. For these days a faster charging might be necessary, but it may be inconvenient to do on a regular basis. Therefore these may be limited to once a month or once every other month. The third region 120 represents days where the travel is beyond the capabilities of the BEV. These might be trips to another state, etc. In general these trips may be planned in advance, and thus other arrangements may need to be made, such as renting a vehicle with a longer range.

In some embodiments, a probability that the vehicle will travel more than a specific distance is calculated. In these embodiments, the probability may be calculated using the below equation:

$$p(x) = \frac{w}{k} e^{-x/k} + (1-w) \frac{1}{\sqrt{2\pi\sigma^2}} e^{-(x-\mu)^2/2\sigma^2} \quad \text{Eq. (1)}$$

where w is a share of miles described by a random background, k is a measure of decay (fast decay means fewer long trips), σ is the variability or tightness of the habitual peak 110 (low variability means predictable usage), and μ is habitual peak 110. For example, if the maximum range of the BEV on a single charge is 80 miles, then the probability may be calculated at a lower values, i.e., 50 miles. This lower value may be based on a usable range of the BEV, where some of the usable range is a reduction of the maximum range based on a safety margin for weather, velocity, and other factors. In some embodiments, the usable range is further reduced by a buffer amount of charge that drivers tend to keep from going below to prevent running out of charge.

In some further embodiments, a plurality of driving profiles 100 is generated for a plurality of vehicles. The driving profiles are then sorted by increasing habitual peak 110, where the lower the mileage associated with habitual peak 110, the more likely that the BEV is a potential replacement for the associated vehicle. In some of these embodiments, P (usable range), the probability of exceeded the usable range of the BEV, is calculated for each of the plurality of driving profiles 100. The P (usable range) is then used to further determine whether or not the BEV is a replacement for the associated vehicle. If the P (usable range) is too high, then the BEV may not be a replacement for associated vehicle.

In some further embodiments, analysis of a plurality of driving profiles 100 may be used to design a power plant for a vehicle. For example, different trends within the plurality of driving profiles 100 may point to design issues with the range and/or recharging capabilities of a vehicle.

Figure 2:
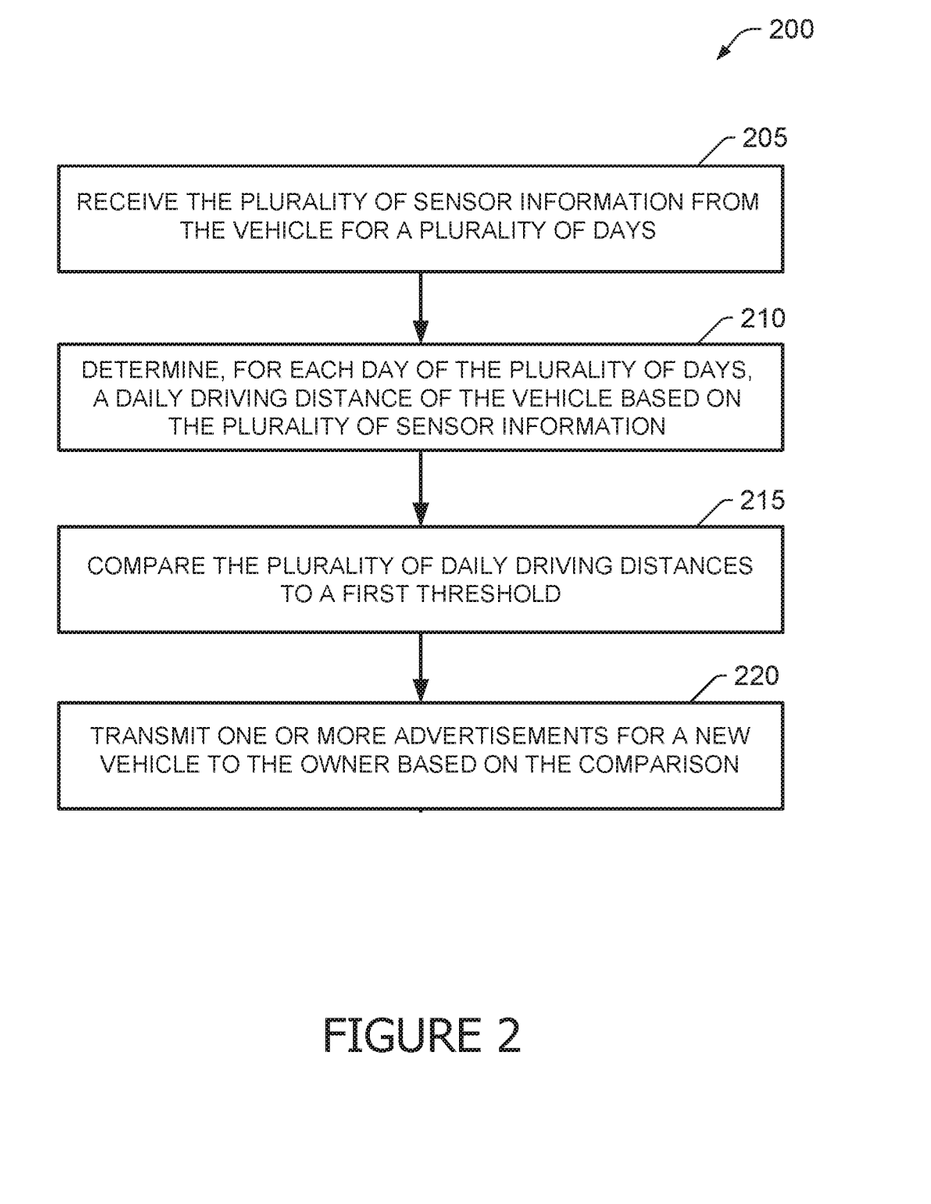
FIG. 2 is a flow chart of an exemplary process for use in analyzing driving behavior for marketing battery electric vehicles using the driving profile shown in FIG. 1.

FIG. 2 is a flow chart of an exemplary process 200 for use in analyzing driving behavior for marketing battery electric vehicles using driving profile 100 (shown in FIG. 1). In the exemplary embodiment, process 200 is performed by driving analysis (DA) server 310 (shown in FIG. 3).

In the exemplary embodiment, DA server 310 receives 205 a plurality of sensor information from a vehicle. The plurality of sensor information includes information for a plurality of days, such as for an entire year. In some embodiments, the plurality of sensor information covers multiple years. In some embodiments, the plurality of sensor information is from one or more sensors attached to or associated with a vehicle. In the exemplary embodiment, the sensor information includes information about the distance traveled by the vehicle each day. In some embodiments, the sensor information includes distance information about each trip made by the vehicle, including distance travelled, starting time and ending time of the trip, and date of the trip.

For each day covered by the plurality of sensor information, DA server 310 determines 210 a daily driving distance of the vehicle based on the plurality of sensor information. In the exemplary embodiment, the daily driving distance of the vehicle is the number of miles traveled by the vehicle during a particular day. In the exemplary embodiment, DA server 310 compares 215 the plurality of driving distances to a first threshold, such as first threshold 112 (shown in FIG. 1). As described above, the first threshold 112 may be based on the usable range of the BEV to be marketed. In some embodiments, DA server 310 calculates first threshold 112 based on a percentage of days where the daily driving distance for that day exceeded the usable range of the BEV. For example, first threshold 112 may be the percentage of days of the year that the daily driving distance exceeded the usable range of the BEV is less than 90% of the days of the year. In some further embodiments, DA server 310 calculates a second threshold, such as second threshold 114 (shown in FIG. 1) based on a fast recharge of the BEV and a percentage of days where the daily driving distance exceeds the first threshold and does not exceed the second threshold. For example, second threshold 114 may be the number of days or percentage of days that the daily driving distances do not exceed the usable range of the BEV with an additional charge. For example, first threshold may be 90% and second threshold may be 98%. Where DA server 310 determines that the daily driving distances do not exceed the usable range more than 10% of the days, and do not exceed the usable range with a recharge more than 2% of the days.

DA server 310 transmits 220 one or more advertisements for a new vehicle, such as a BEV, to an individual associated with the vehicle. The individual may be the driver of the vehicle or the owner of the vehicle. In the exemplary embodiment, DA server 310 compares 215 the daily driving distances to first threshold 112. The advertisements are designed to offer the BEV as a replacement for the vehicle associated with driving profile 100. If DA server 310 determines that a predetermined portion or percentage of the daily driving distances is less than first threshold 112, DA server 310 transmits 220 one or more advertisements to the individual associated with the vehicle. In some further embodiments, DA server 310 transmits 220 the one or more advertisements if a first predetermined portion of the daily driving distances are less than first threshold 112 and a second predetermined portion of the daily driving distances are less than second threshold 114.

In other embodiments, DA computer device 310 calculates a habitual peak 110 (shown in FIG. 1) for the vehicle based on a mean of the daily driving distances. DA computer device 310 calculates a probability that the vehicle will exceed the usable range of the BEV. Based on the habitual peak 110 and the probability that the vehicle will exceed the usable range, DA server 310 determines whether or not to transmit 220 the one or more advertisements to the individual associated with the vehicle. For example, if the habitual peak 110 is 20 miles a day and if the probability is less than 3%, DA server 310 may determine to transmit 220 the one or more advertisements. These values may be adjusted based on user preferences.

In some embodiments, DA server 310 transmits 220 the one or more advertisements via email to the individual. In other embodiments, DA server 310 places one or more phone calls to the individual. In still other embodiments, DA server 310 orders one or more physical mail packets of advertisements to be delivered to the individual. In still further embodiments, DA server 310 instructs one or more salespeople to contact the individual.

In further embodiments, DA server 310 receives 205 a plurality of sensor information from a plurality of vehicles. DA server 310 generates driving profiles 100 for each vehicle. DA server 310 determines 210 the plurality of daily driving distances for each of the plurality of vehicles. DA server 310 compares 215 each of the plurality of daily driving distances for each of the plurality of vehicles to the first threshold 112. DA server 310 determines a subset of the plurality of owners based on the comparison. In some embodiments, the subset of owners is all of the owners of vehicles that meet the first threshold 112. In other embodiments, the subset of owners is a prioritized group of owners whose vehicles meet the first threshold 112.

Figure 3:
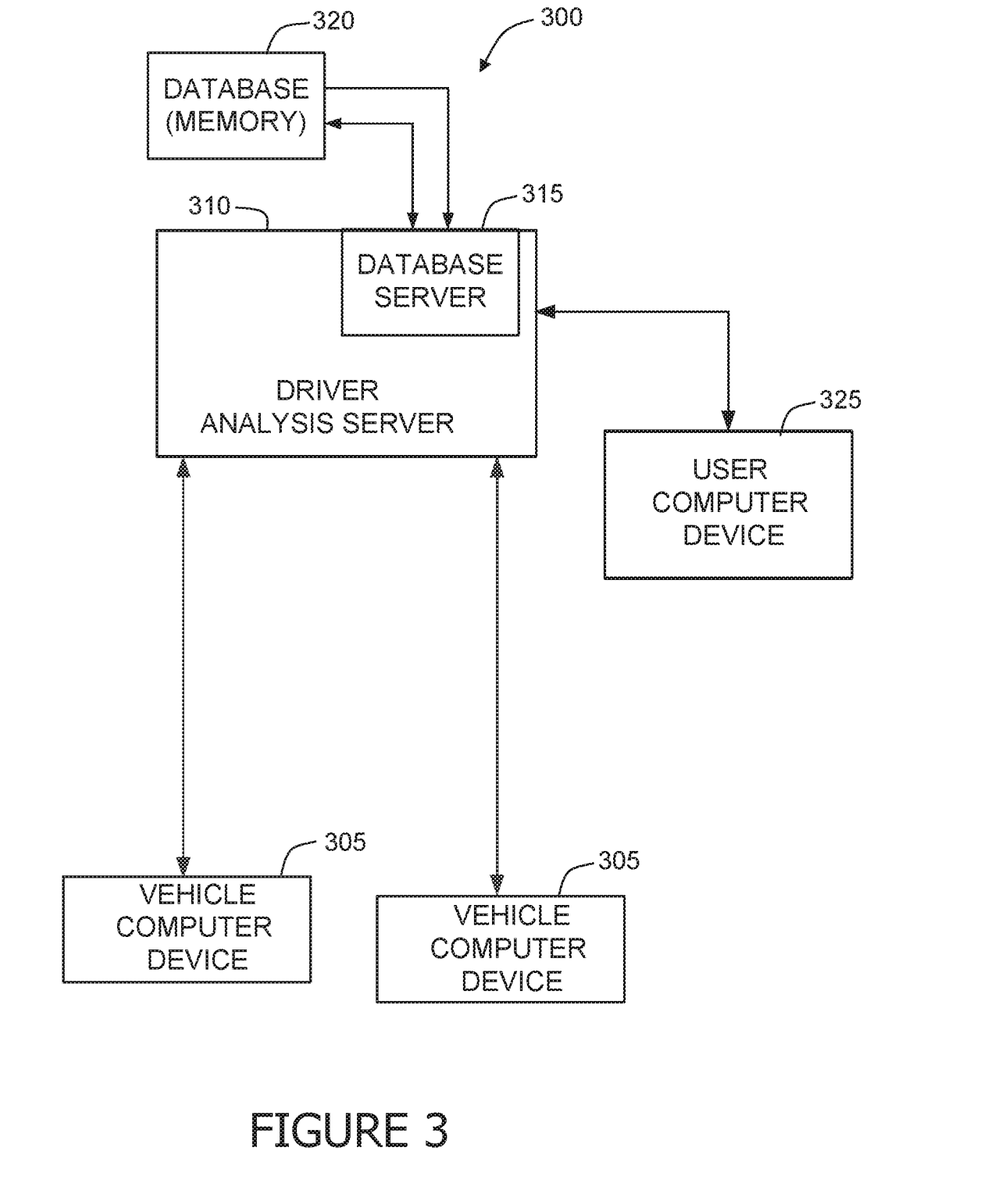
FIG. 3 illustrates a simplified block diagram of an exemplary computer system for implementing the process shown in FIG. 2.

FIG. 3 depicts a simplified block diagram of an exemplary system 300 for implementing process 200 shown in FIG. 2. In the exemplary embodiment, system 300 may be used for analyzing driving behavior for marketing battery electric vehicles (BEV). As described below in more detail, a driver analysis ("DA") server 310 (also known as a DA computer device 310), may be configured to (i) receive a plurality of sensor information from a vehicle 600 (shown in FIG. 6). The plurality of sensor information includes information for a plurality of days. DA server 310 may also be configured to determine, for each day of the plurality of days, a daily driving distance of the vehicle based on the plurality of sensor information. DA server 310 may further be configured to compare the plurality of daily driving distances to a first threshold 112 (shown in FIG. 1). In addition, DA server 310 may be configured to transmit one or more advertisements for a new vehicle to an individual associated with the vehicle 600 based on the comparison.

In the exemplary embodiment, vehicle computer devices 305 are computers that include a web browser or a software application, which enables vehicle computer devices 305 to access remote computer devices, such as DA server 310, using the Internet or other network. More specifically, vehicle computer devices 305 is communicatively coupled to DA server 310 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Vehicle computer devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, vehicle computer devices 305 are associated with vehicle 600 and are in communication with one or more sensors of vehicle 600, such as sensor 605 (shown in FIG. 6).

In the exemplary embodiment, user computer devices 325 are computers that include a web browser or a software application, which enables user computer devices 325 to access remote computer devices, such as DA server 310, using the Internet or other network. More specifically, user computer devices 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 315 is communicatively coupled to a database 320 that stores data. In one embodiment, database 320 may include sensor information, driving profiles 100, new vehicle profiles, and one or more business rules. In the exemplary embodiment, database 320 is stored remotely from IM server 310. In some embodiments, database 320 is decentralized. In the exemplary embodiment, a user, such as user 102, may access database 320 via user computer device 325 by logging onto DA server 310, as described herein.

DA server 310 may be in communication with a plurality of vehicle computer devices 305 and a plurality of user computer devices 325 to analyze driving behavior for marketing battery electric vehicles based on driving profiles 100. In some embodiments, DA server 310 may be associated with an automobile manufacturer or retailer. In other embodiments, DA server 310 may be associated with a third party.

Figure 4:
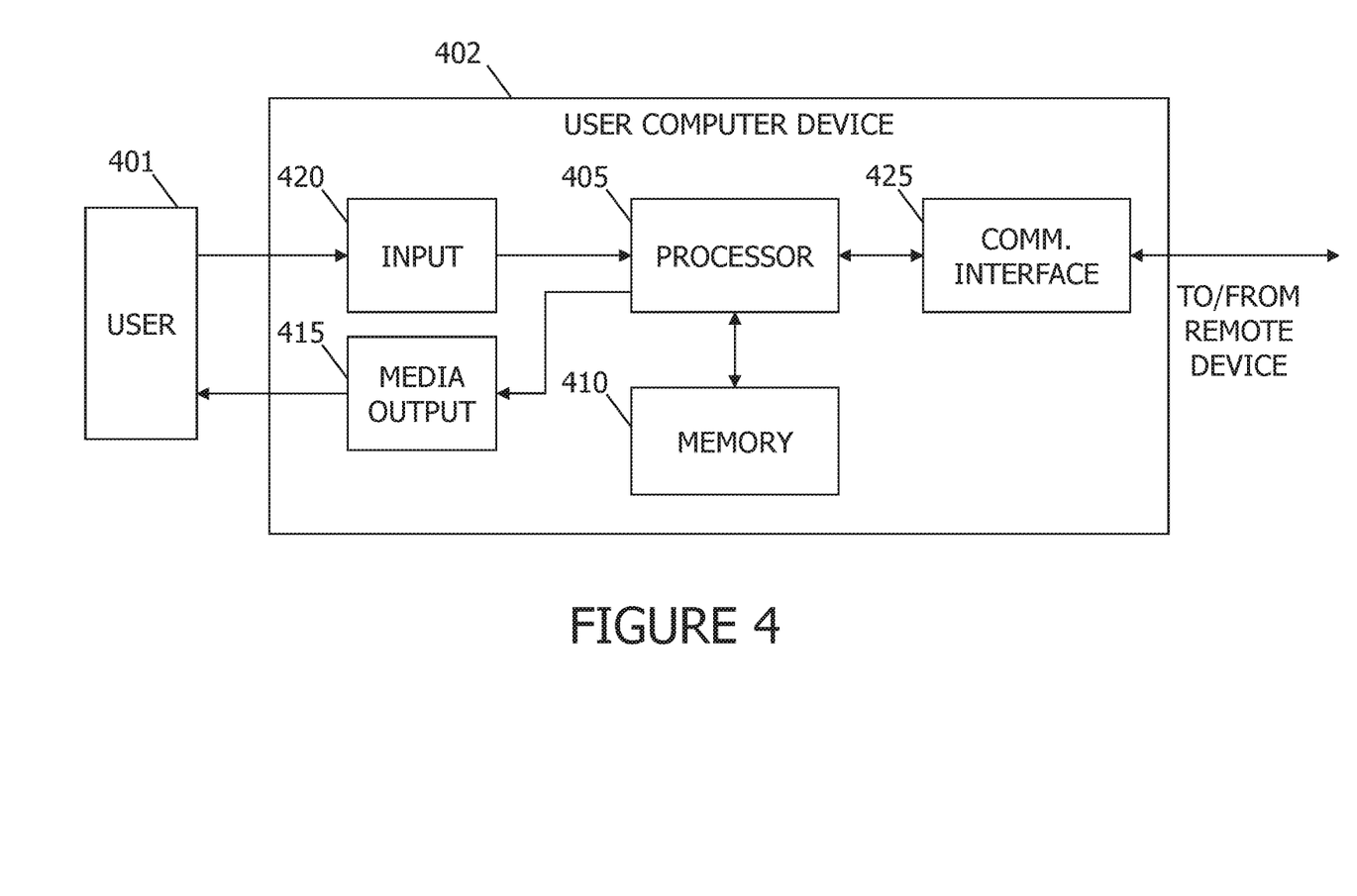
FIG. 4 illustrates an exemplary configuration of a client computer device, in accordance with one embodiment of the present disclosure.

FIG. 4 depicts an exemplary configuration of client computer device, in accordance with one embodiment of the present disclosure. User computer device 402 may be operated by a user 401. User computer device 402 may include, but is not limited to, vehicle computer device 305, user computer devices 325 (both shown in FIG. 3), and vehicle controller 610 (shown in FIG. 6). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an online store interface for viewing and/or selecting from the plurality of offers 110 (shown in FIG. 1). In some embodiments, user computer device 402 may include an input device 420 for receiving input from user 401. User 401 may use input device 420 to, without limitation, select an offer 110.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as DA server 310 (shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from DA server 310. A client application may allow user 401 to interact with, for example, DA server 310. For example, instructions may be stored by a cloud service, and the output of the execution of the instructions sent to the media output component 415.

Figure 5:
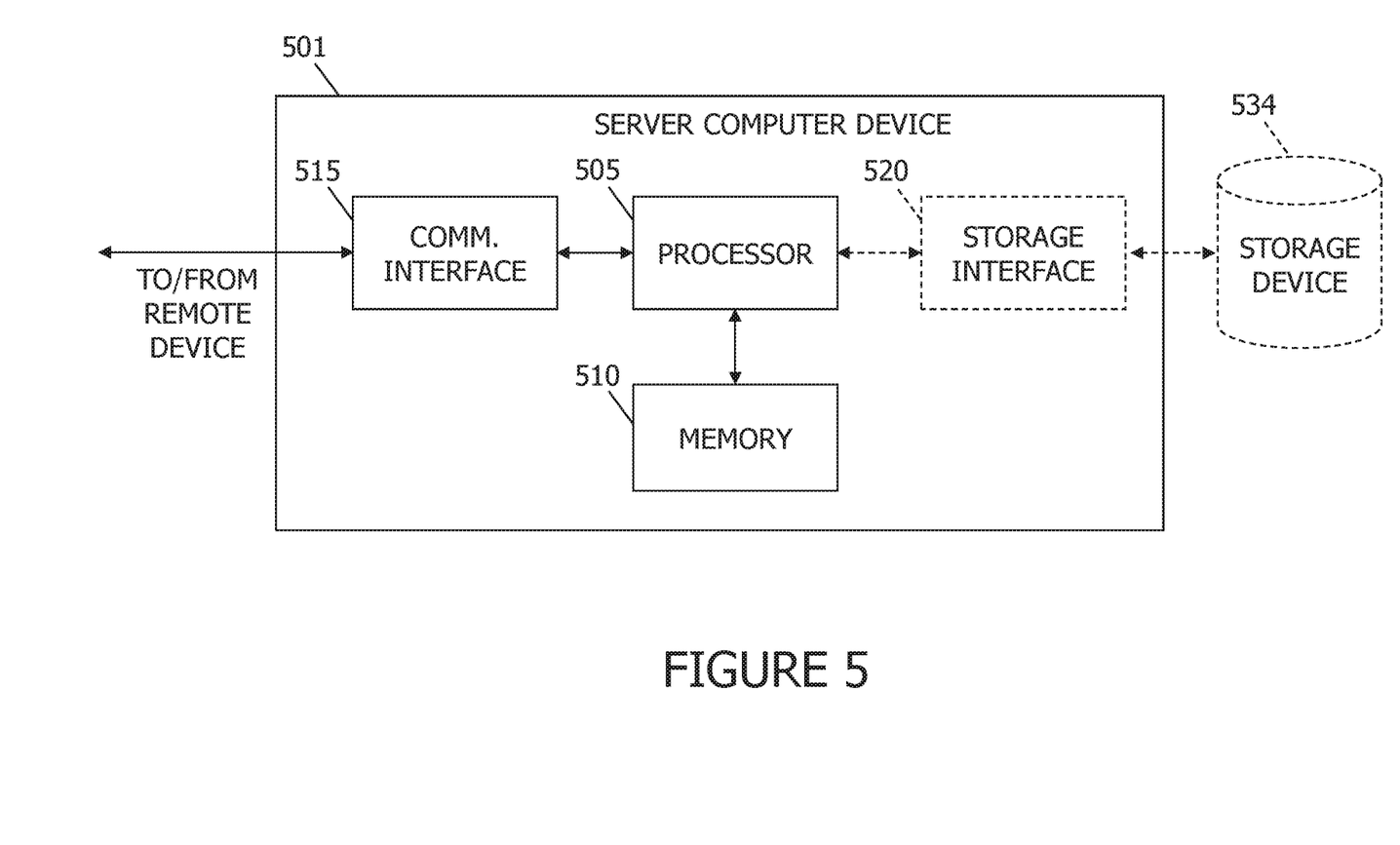
FIG. 5 illustrates an exemplary configuration of a server system, in accordance with one embodiment of the present disclosure.

FIG. 5 depicts an exemplary configuration of server system, in accordance with one embodiment of the present disclosure. Server computer device 501 may include, but is not limited to, DA server 310 and database server 315 (both shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, DA server 310, vehicle computer device 305, and user computer device 325 (both shown in FIG. 3) (for example, using wireless communication or data transmission over one or more radio links or digital communication channels). For example, communication interface 515 may receive requests from user computer devices 325 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIG. 2.

Figure 6:
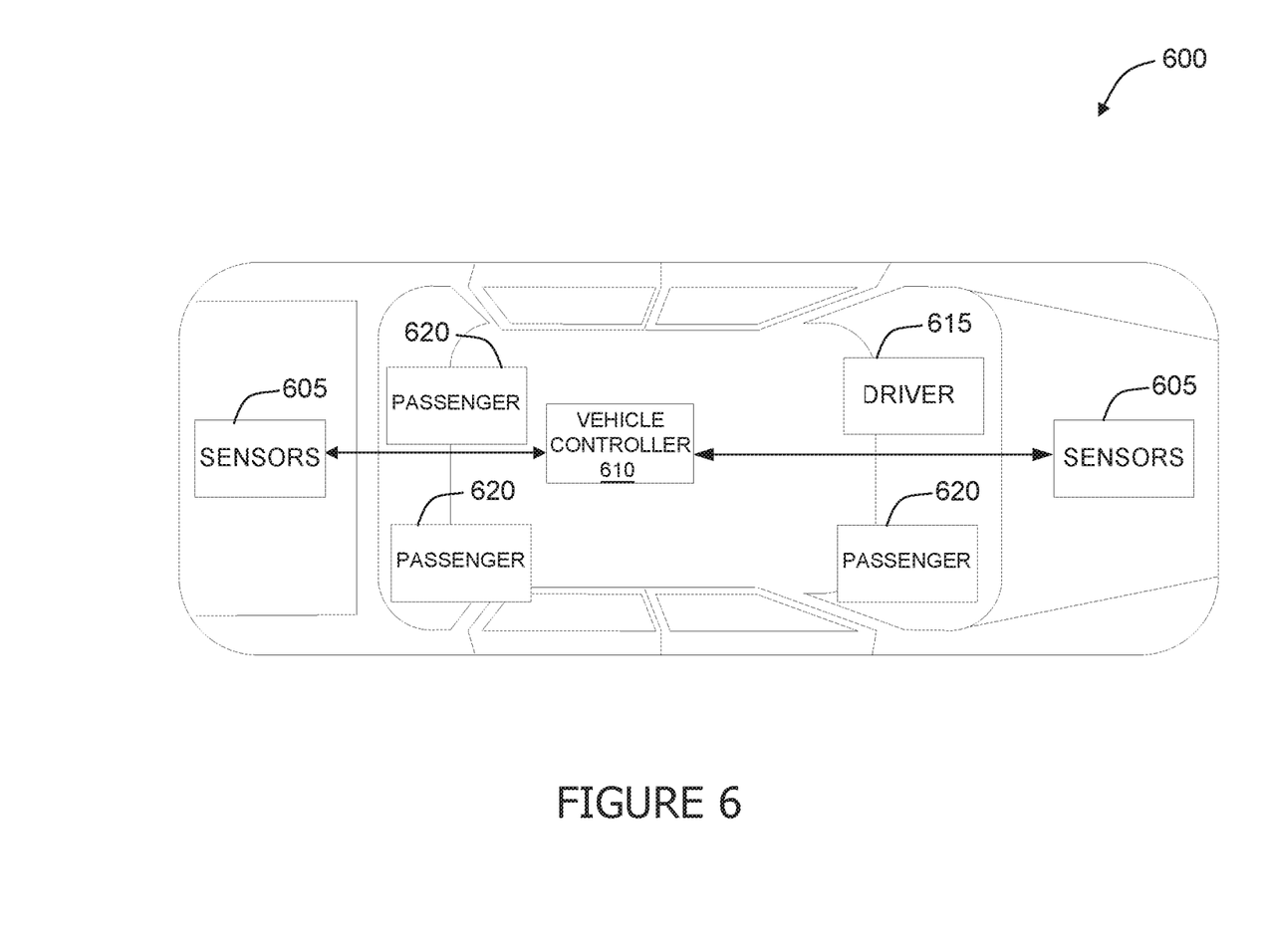
FIG. 6 illustrates an exemplary vehicle that may generate the driving profile shown in FIG. 1.

FIG. 6 illustrates and exemplary vehicle 600 that may generate the driving profile 100 (shown in FIG. 1). In some embodiments, vehicle 600 is an autonomous vehicle capable of fulfilling the transportation capabilities of a traditional automobile or other vehicle. In these embodiments, vehicle 600 is capable of sensing its environment and navigating without human input. In other embodiments, vehicle 600 is a manual vehicle, such as a traditional automobile that is controlled by a driver 615.

Vehicle 600 includes a plurality of sensors 605 and a vehicle controller 610. The plurality of sensors 605 may detect the current surroundings and location of vehicle 600. Plurality of sensors 605 may include, but are not limited to, radar, LIDAR, Global Positioning System (GPS), video devices, imaging devices, cameras, audio recorders, and computer vision. Plurality of sensors 605 may also include sensors that detect conditions of vehicle 600, such as velocity, acceleration, gear, braking, and other conditions related to the operation of vehicle 600. In some embodiments, plurality of sensors 605 may detect the presence of driver 615 and one or more passengers 620 in vehicle 600. In these embodiments, plurality of sensors 605 may detect the presence of fastened seatbelts, the weight in each seat in vehicle 600, heat signatures, or any other method of detecting information about driver 615 and passengers 620 in vehicle 600.

Vehicle controller 610 may interpret the sensory information to identify appropriate navigation paths, detect threats, react to conditions, and operate vehicle 600. In some embodiments, vehicle controller 610 may be able to communicate with one or more remote computer devices, such as DA server 310 (shown in FIG. 3).

While vehicle 600 may be an automobile in the exemplary embodiment, in other embodiments, vehicle 600 may be, but is not limited to, other types of ground craft, aircraft, and watercraft vehicles.

Figure 7:
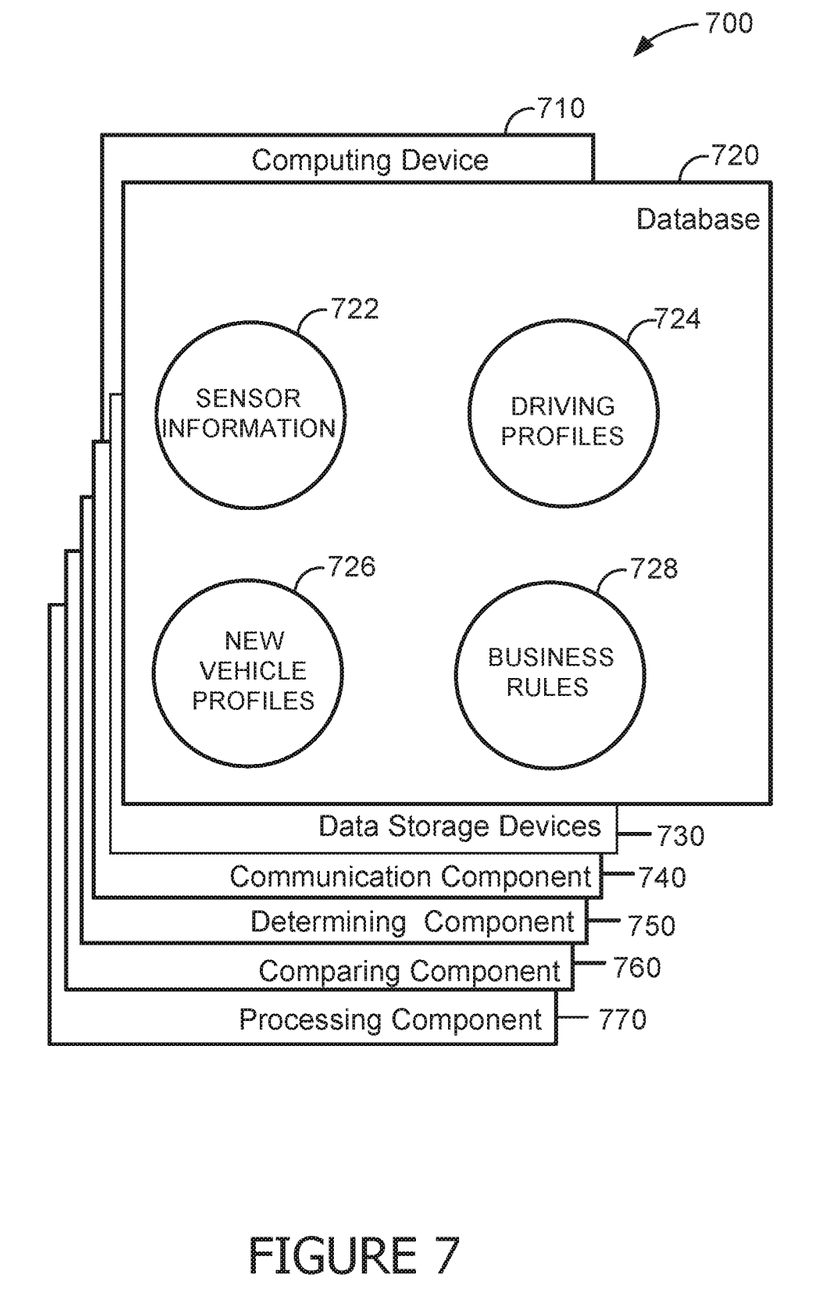
FIG. 7 illustrates a diagram of components of one or more exemplary computing devices that may be used in the process shown in FIG. 2 and the system shown in FIG. 3.

FIG. 7 depicts a diagram 700 of components of one or more exemplary computing devices 710 that may be used to implement process 200 shown in FIG. 2 and system 300 shown in FIG. 3. In some embodiments, computing device 710 may be similar to DA server 310 (shown in FIG. 3). Database 720 may be coupled with several separate components within computing device 710, which perform specific tasks. In this embodiment, database 720 may include sensor information 722, driving profiles 724 (such as driving profile 100 shown in FIG. 1), new vehicle profiles 726, and one or more business rules 728. In some embodiments, database 720 is similar to database 320 (shown in FIG. 3).

Computing device 710 may include the database 720, as well as data storage devices 730. Computing device 710 may also include a communication component 740 for receiving 205 a plurality of sensor information and transmitting 720 one or more advertisements (both shown in FIG. 2). Computing device 710 may further include a determining component 750 for determining 210 a daily driving distance (shown in FIG. 2). Moreover, computing device 710 may include a comparing component 760 for comparing 215 the plurality of driving distances to a first threshold (shown in FIG. 2). A processing component 770 may assist with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the Willis "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

While the disclosure has been described in terms of various specific embodiments, those skilled in the art will recognize that the disclosure can be practiced with modification within the spirit and scope of the claims.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A system comprising:
    an automobile associated with an owner, the automobile comprising:
    a plurality of sensors, wherein at least one sensor of the plurality of sensors is a global positioning system (GPS) sensor; and
    a vehicle controller, wherein the vehicle controller is programmed to:
    collect a plurality of sensor information observed by the plurality of sensors during operation of the automobile including travel distances observed by the GPS sensor; and
    transmit the plurality of sensor information; and
    a driver analysis computer device comprising at least one processor in communication with at least one memory device, wherein the driver analysis computer device is programmed to:
    receive the plurality of sensor information from the automobile, wherein the plurality of sensor information includes information for a plurality of days;
    determine, for each day of the plurality of days, a daily driving distance of the automobile based on the plurality of sensor information;
    compare the plurality of daily driving distances to a single charge distance threshold based on a usable range of a new vehicle on a single charge and a two charge distance threshold based on a usable range of the new vehicle on two charges;
    determine a first percentage of days that the single charge distance threshold was not exceeded;
    determine a second percentage of days that the two charge distance threshold was not exceeded;
    compare the first percentage of days to a first percentage threshold;
    compare the second percentage of days to a second percentage threshold;
    determine a mean distance threshold based on the plurality of sensor information;

if the single charge distance threshold exceeds the mean distance threshold, determine a probability that the automobile will be driven below the mean distance threshold; and if the single charge distance threshold exceeds the mean distance threshold, determine whether or not to transmit one or more advertisements for the new vehicle to the owner based on the two comparisons and the probability.

2. A system in accordance with claim 1, wherein the new vehicle is a battery electric vehicle (BEV) and wherein the single charge distance threshold is based on a usable range of the BEV.

3. A system in accordance with claim 1, wherein the driver analysis computer device is further programmed to:

determine a third percentage of days where the two charge distance threshold was exceeded;

compare the third percentage of days to a third percentage threshold; and determine whether or not to transmit the one or more advertisements based on the comparison.

4. A system in accordance with claim 1, wherein the driver analysis computer device is further programmed to:

determine a mean distance traveled based on the plurality of daily driving distances; and compare the mean distance travelled to the usable range of the automobile to determine whether or not to transmit the one or more advertisements.

5. A system in accordance with claim 4, wherein the driver analysis computer device is further programmed to:

calculate a probability that the automobile will exceed the usable range of the automobile; and automatically transmit the one or more advertisements for the automobile to the owner where the mean distance travelled does not exceed the single charge distance threshold and where the probability does not exceed a probability threshold.

6. A system in accordance with claim 1, wherein the driver analysis computer device is further programmed to:

receive a plurality of sensor information from a plurality of automobiles associated with a plurality of owners;

determine the plurality of daily driving distances for each of the plurality of automobiles;

compare each of the plurality of daily driving distances for each of the plurality of automobiles to the single charge distance threshold;

determine a subset of the plurality of owners based on the comparison; and transmit one or more advertisements for the new vehicle to the subset of the plurality of owners.

7. A system in accordance with claim 1, wherein the usable range of the automobile is based on a maximum range of the automobile on a single charge reduced by a safety margin.

8. A system in accordance with claim 7, wherein the usable range of the automobile is further reduced by a user buffer of charge.

9. A system in accordance with claim 1, wherein the driver analysis computer device is further programmed to:

receive a plurality of sensor information from a plurality of automobiles associated with a plurality of owners;

determine the plurality of daily driving distances for each of the plurality of automobiles;

compare each of the plurality of daily driving distances for each of the plurality of automobiles to the single charge distance threshold;

determine at least one trend based on the comparison; and adjust a design of a power plant for the new vehicle based on the at least one trend.

\* \* \* \* \*